US 12,009,719 B2

(12) United States Patent
Maeda et al.

(10) Patent No.: US 12,009,719 B2
(45) Date of Patent: Jun. 11, 2024

(54) VIBRATION GENERATING DEVICE

(71) Applicant: ALPS ALPINE CO., LTD., Tokyo (JP)

(72) Inventors: Masanobu Maeda, Miyagi (JP); Katsutoshi Suzuki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 260 days.

(21) Appl. No.: 17/805,737

(22) Filed: Jun. 7, 2022

(65) Prior Publication Data

US 2022/0302813 A1   Sep. 22, 2022

Related U.S. Application Data

(63) Continuation of application No. PCT/JP2020/041680, filed on Nov. 9, 2020.

(30) Foreign Application Priority Data

Dec. 11, 2019   (JP) .................................. 2019-223725

(51) Int. Cl.
*H02K 33/02*   (2006.01)
*B06B 1/04*   (2006.01)

(52) U.S. Cl.
CPC ............. *H02K 33/02* (2013.01); *B06B 1/045* (2013.01)

(58) Field of Classification Search
CPC ..................................................... B06B 1/045
(Continued)

(56) References Cited

U.S. PATENT DOCUMENTS

2008/0089168 A1*   4/2008   Higuchi .................. B06B 1/045
                                                                366/116
2011/0062804 A1*   3/2011   Lee ........................ H02K 33/18
                                                                310/30
(Continued)

FOREIGN PATENT DOCUMENTS

JP   2017-022964   1/2017
JP   2017-028976   2/2017
(Continued)

OTHER PUBLICATIONS

International Search Report for PCT/JP2020/041680 mailed on Feb. 2, 2021.

*Primary Examiner* — Ahmed Elnakib
(74) *Attorney, Agent, or Firm* — IPUSA, PLLC

(57) ABSTRACT

A vibration generating device includes a housing, a vibrator including a magnet, and a resilient member between the housing and the vibrator. The vibration generating device includes a coil configured to generate a magnetic field that causes the vibrator to vibrate. The vibration generating device includes a bracket including a coil-mounting portion on which the coil is mounted. The housing includes bracket supports provided at ends of two opposing side surfaces among the four side surfaces of the housing, the ends being situated opposite ends, of the two opposing side surfaces, to which the bottom of the housing is connected. The bracket includes connection portions bonded to the respective bracket supports. The bracket supports of the housing and the connection portions of the bracket are connected together in a state in which the bracket is inserted into a space of the housing.

7 Claims, 14 Drawing Sheets

(58) Field of Classification Search
USPC .......................................................... 310/81
See application file for complete search history.

(56) References Cited

U.S. PATENT DOCUMENTS

| | | |
|---|---|---|
| 2017/0012514 A1 | 1/2017 | Xu et al. |
| 2017/0019009 A1 | 1/2017 | Xu et al. |
| 2019/0190365 A1 | 6/2019 | Takeda et al. |
| 2019/0305659 A1 | 10/2019 | Kitahara et al. |
| 2020/0366177 A1* | 11/2020 | Maeda .................. H02K 33/02 |
| 2021/0067021 A1* | 3/2021 | Maeda .................. H02K 33/16 |
| 2022/0302813 A1* | 9/2022 | Maeda .................. B06B 1/045 |

FOREIGN PATENT DOCUMENTS

| | | |
|---|---|---|
| JP | 2019-062627 | 4/2019 |
| JP | 2019-180148 | 10/2019 |
| WO | 2018/030265 | 2/2018 |

* cited by examiner

VIBRATION GENERATING DEVICE

CROSS-REFERENCE TO RELATED APPLICATIONS

This application is a continuation application of International Application No. PCT/JP2020/041680, filed on Nov. 9, 2020, and designated the U.S., which is based upon and claims priority to Japanese Patent Application No. 2019-223725, filed on Dec. 11, 2019, the entire contents of which are incorporated herein by reference.

BACKGROUND

1. Field of the Invention

The present disclosure relates to a vibration generating device.

2. Description of the Related Art

Some portable electronic devices, such as mobile phones and game machines, include vibration generating devices in order to notify users of incoming calls through vibrations or to provide users with a feel based on development of a game. For example, as such a vibration generating device, a vibration generating device is disclosed in which a magnet is mounted on a coned-disc spring that is formed by folding a metal plate in a different direction, and the magnet is vibrated (for example, Patent Documents 1 and 2).

RELATED-ART DOCUMENT

Patent Document

[Patent Document 1] Japanese Unexamined Patent Application Publication No. 2017-22964
[Patent Document 2] Japanese Unexamined Patent Application Publication No. 2017-28976

In the above vibration generating device, for example, vibrations are generated through a magnetic field, and the magnetic field is generated by alternating moving a permanent magnet as a vibrator. With this arrangement, a coil-supporting member for securing the coil is provided, and the coil-supporting member is bonded to the bottom of a housing. However, the housing is relatively thin and thus is likely to be deformable. If the permanent magnet as the vibrator vibrates, the coil may also vibrate in accordance with vibrations of the magnet, and thus there are cases where desired vibration characteristics may not be obtained. Also, when the coil-supporting member is bonded to the bottom of the housing by welding, there is increased burden in the task of bonding. Bonding cannot be easily performed, and thus requires increased time and task burden.

Therefore, in the present disclosure, a vibration generating device that provides a desired vibration characteristic and is easily manufactured at low cost is provided.

According to one aspect of one or more embodiments below, a vibration generating device includes a housing including a substantially rectangular bottom and four side surfaces, the housing having an interior space. The vibration generating device includes a vibrator including a magnet. The vibration generating device includes a resilient member between the housing and the vibrator. The vibration generating device includes a coil configured to generate a magnetic field that causes the vibrator to vibrate. The vibration generating device includes a bracket including a coil-mounting portion on which the coil is mounted. The housing includes bracket supports provided at ends of two opposing side surfaces among the four side surfaces of the housing, the ends being situated opposite ends of the two opposing side surfaces to which the bottom of the housing is connected. The bracket includes connection portions bonded to the respective bracket supports. The bracket supports of the housing and the connection portions of the bracket are connected together in a state in which the bracket is inserted into a space of the housing.

According to a vibration generating device of the present disclosure, a desired vibration characteristic can be provided, and the vibration generating device is manufactured at low cost.

DESCRIPTION OF THE EMBODIMENTS

One or more embodiments will be described below. The same components or the like are denoted by the same numerals, and accordingly, description thereof is omitted. In this description, an X1-X2 direction, a Y1-Y2 direction, and a Z1-Z2 direction are perpendicular to one another. A surface including the X1-X2 direction and the Y1-Y2 direction is referred to as an XY plane, a surface including the Y1-Y2 direction and the Z1-Z2 direction is referred to as a YZ plane, and a surface including the Z1-Z2 direction and the X1-X2 direction is referred to as a ZX plane.

Figure 1:
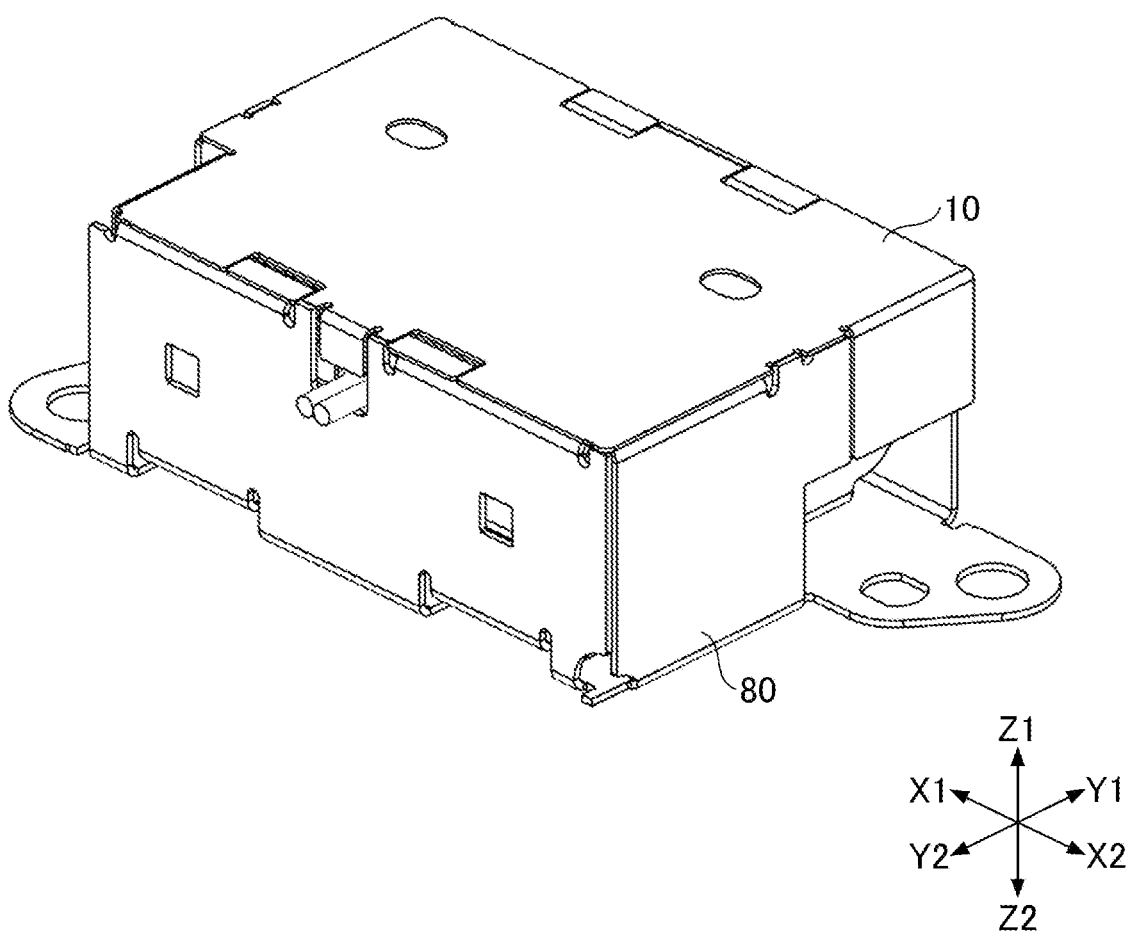
FIG. 1 is a perspective view of a vibration generating device according to the present embodiment.
Figure 2:
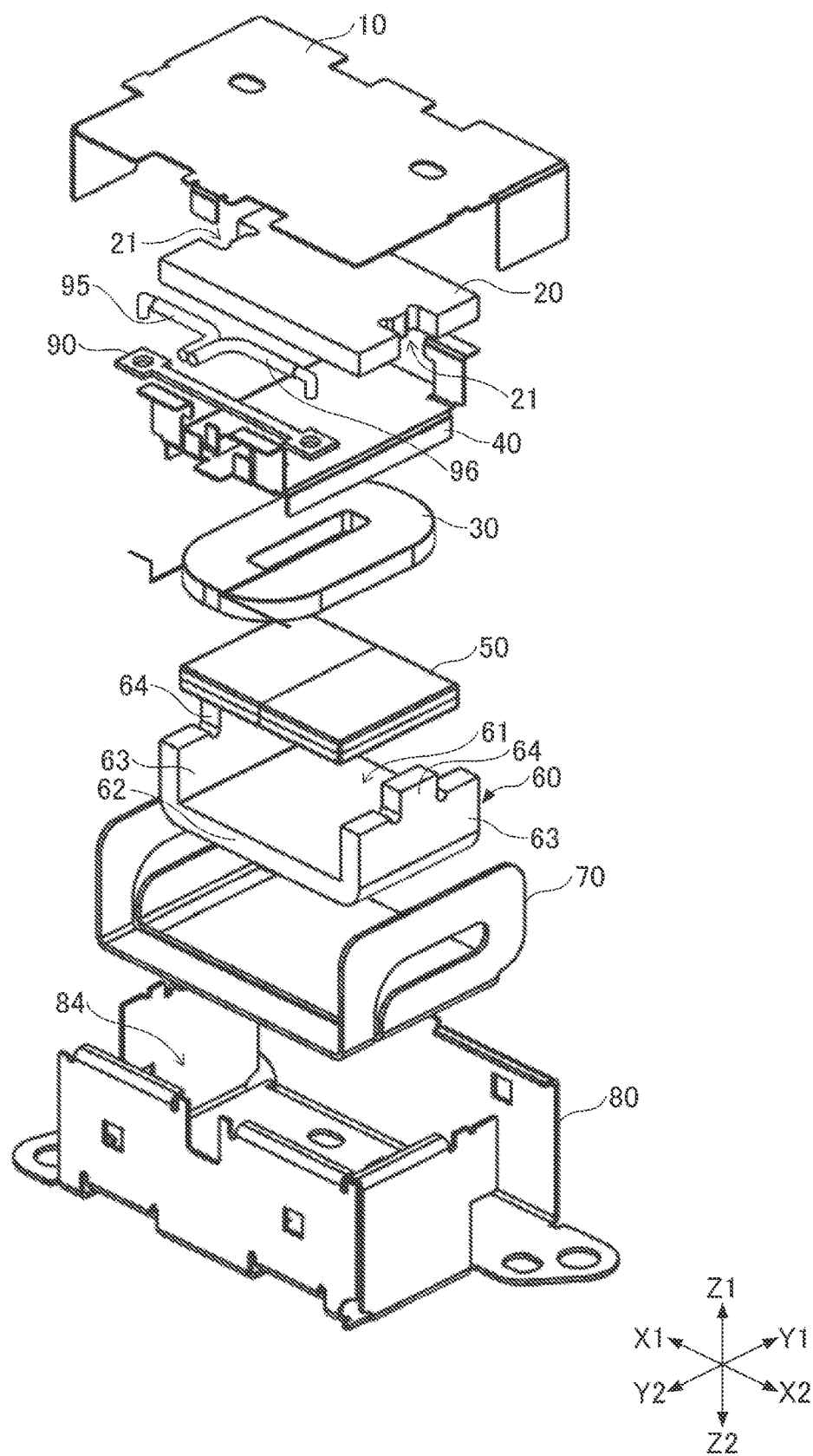
FIG. 2 is an exploded perspective view of the vibration generating device according to the present embodiment.

A vibration generating apparatus according to the present embodiment will be described with reference to FIG. 1 and FIG. 2. FIG. 1 is a perspective view of the vibration generating device according to the present embodiment. FIG. 2 is an exploded perspective view of the vibration generating device. The vibration generating device according to the present embodiment includes a cover 10, an upper yoke 20, a coil 30, a bracket 40, a magnet 50, a lower yoke 60, a resilient member 70, a housing 80, a flexible substrate 90, connection lines 95 and 96, and the like. In the present embodiment, the cover 10, the bracket 40, the resilient member 70, and the housing 80 are each formed of non-magnetic stainless steel, and the upper yoke 20 and the lower yoke 60 are each formed of a magnetic material including Fe or the like.

As illustrated in FIG. 1, the vibration generating device according to the present embodiment has a substantially cubic shape, and in the vibration generating device, an area of each surface parallel to the XY plane is maximized.

Figure 3:
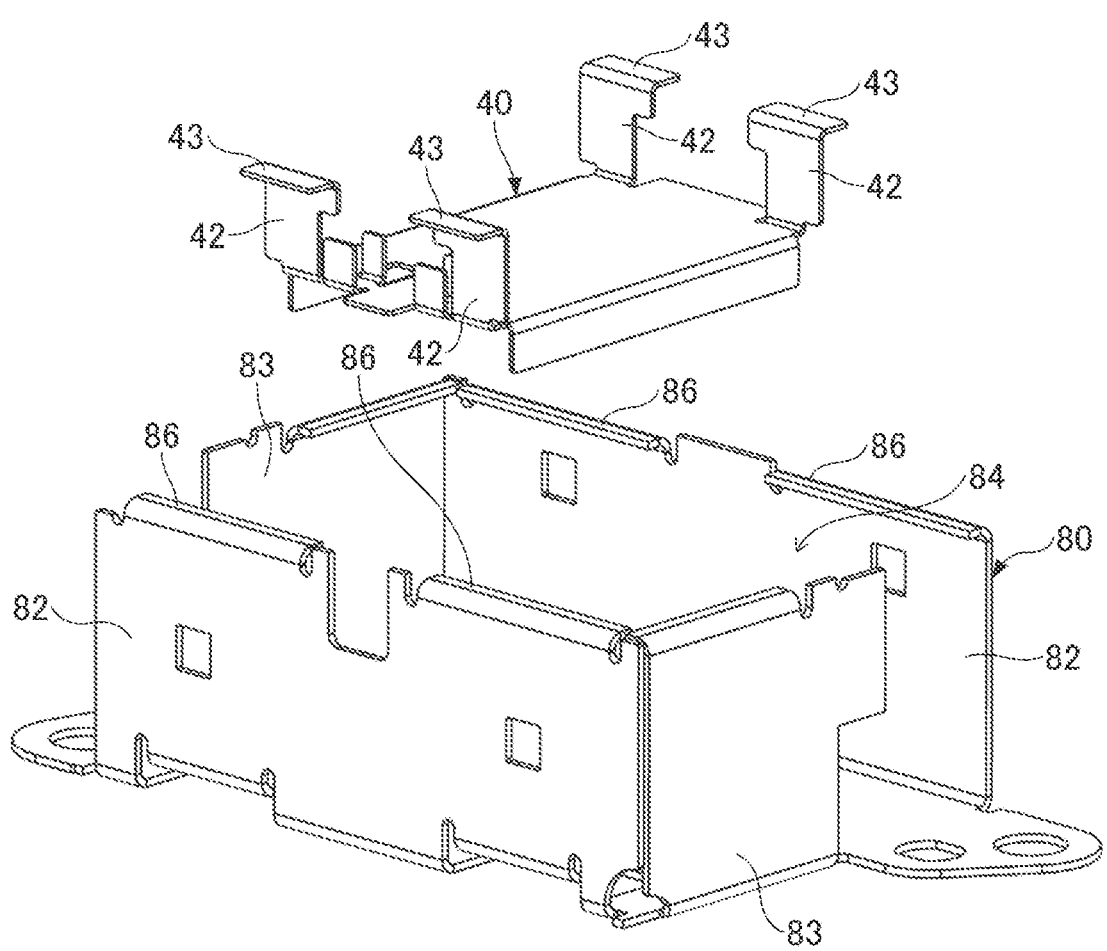
FIG. 3 is a perspective view (1) of a housing and a bracket of the vibration generating device according to the present embodiment.
Figure 4:
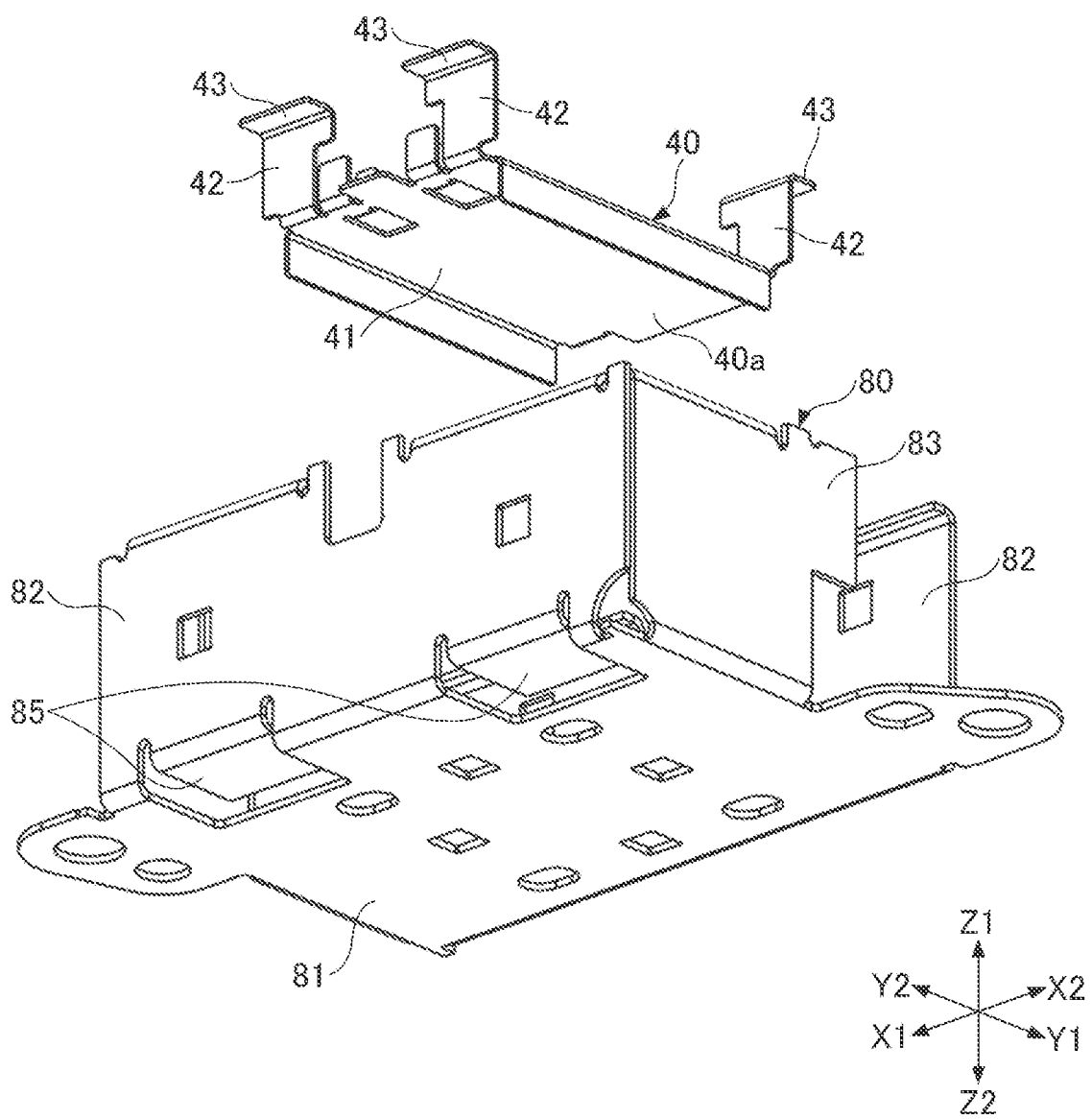
FIG. 4 is a perspective view (2) of the housing and the bracket of the vibration generating device according to the present embodiment.

A housing portion of the vibration generating device according to the present embodiment is constituted by the housing 80 and the cover 10. As illustrated in FIG. 3 and FIG. 4, the housing 80 has a substantially cubic shape, and (i) a bottom 81 parallel to the XY plane of the substantially cubic shape, (ii) two side surfaces 82 that are parallel to the ZX plane and extend in a Z1-direction from the bottom 81, and (iii) two side surfaces 83 parallel to the YZ plane are provided in the vibration generating device. The vibration generating device is formed to have a box like shape having an opening 84 that defines a space. In the present embodiment, a length of each side surface 82 of a substantial rectangle in the X1-X2 direction that refers to a longitudinal direction of the rectangle is greater than a length of a corresponding side surface 83 of the substantially rectangle in the Y1-Y2 direction that refers to the longitudinal direction.

On the same side of the housing as a side where the bottom 81 is provided, each resilient member support 85 is provided to be 1 mm to 2 mm higher than the bottom 81, when viewed from the Z1-side. The resilient member support 85 is a portion that supports the resilient member 70, and has a surface parallel to the XY plane. Further, four bracket supports 86 for supporting the bracket 40 are each provided at a Z1-side end of a given side surface 82, i.e., at an end opposite an end of the given side surface to which the bottom 81 is connected. Each bracket support 86 is formed by bending a portion of the Z1-side end of a given side surface 82, so that the resulting bent portion extends in a vibratory direction (X1-X2 direction) of the vibrator. Each bracket support 86 has a surface parallel to the XY plane. The bracket 40 is also illustrated in FIGS. 3 and 4 and is described below in details.

The resilient member 70, the lower yoke 60, the magnet 50, the bracket 40, the coil 30, and the upper yoke 20 are inserted in an interior of the housing 80. These components are covered with the cover 10, when viewed from the Z1-side that is an upper side. In the present embodiment, the housing 80 or the housing portion that is constituted by the cover 10 and the housing 80 may be referred to as a case.

Figure 5:
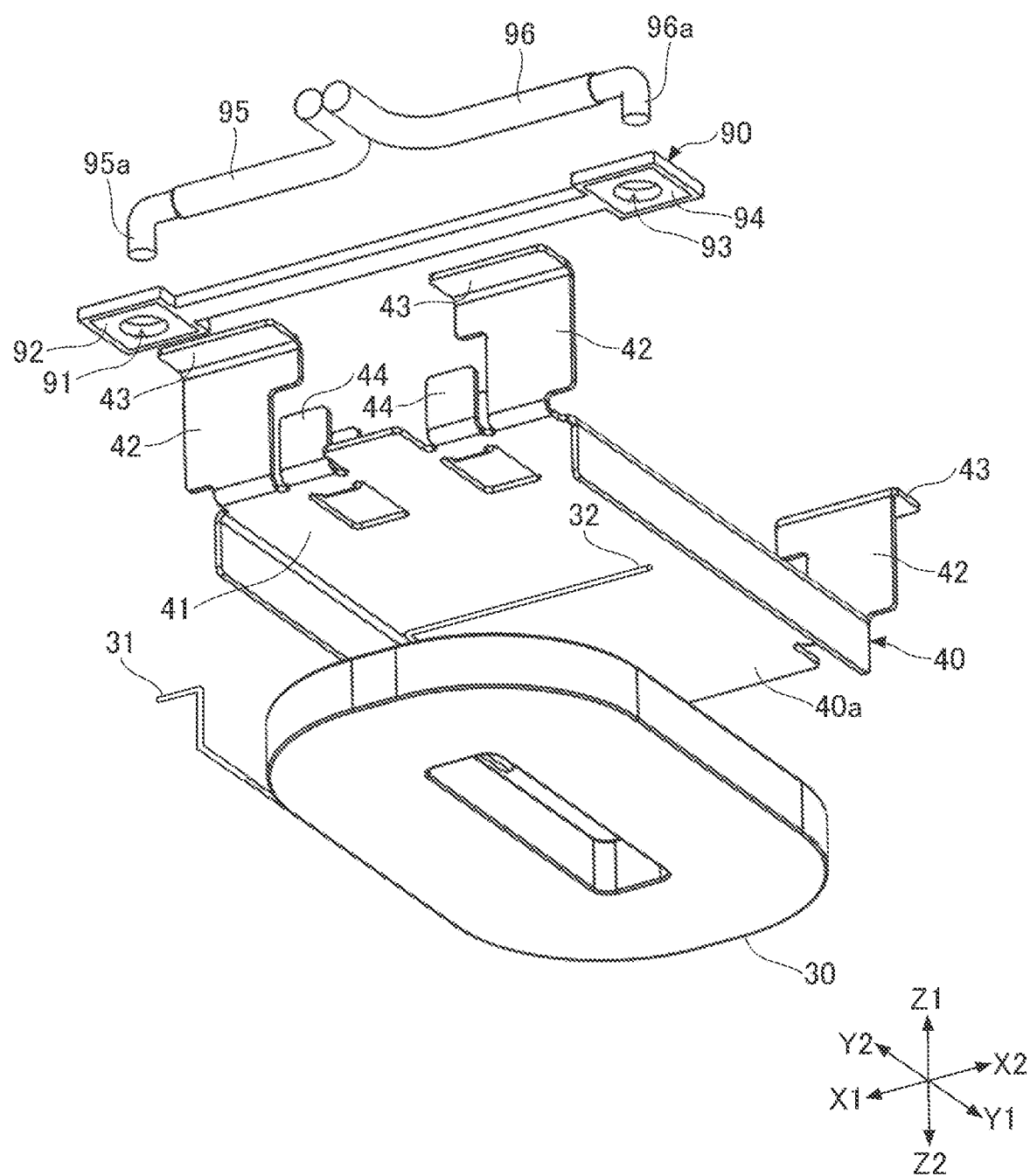
FIG. 5 is an exploded perspective view (1) of the bracket, a coil, and a flexible substrate of the vibration generating device according to the present embodiment.
Figure 6:
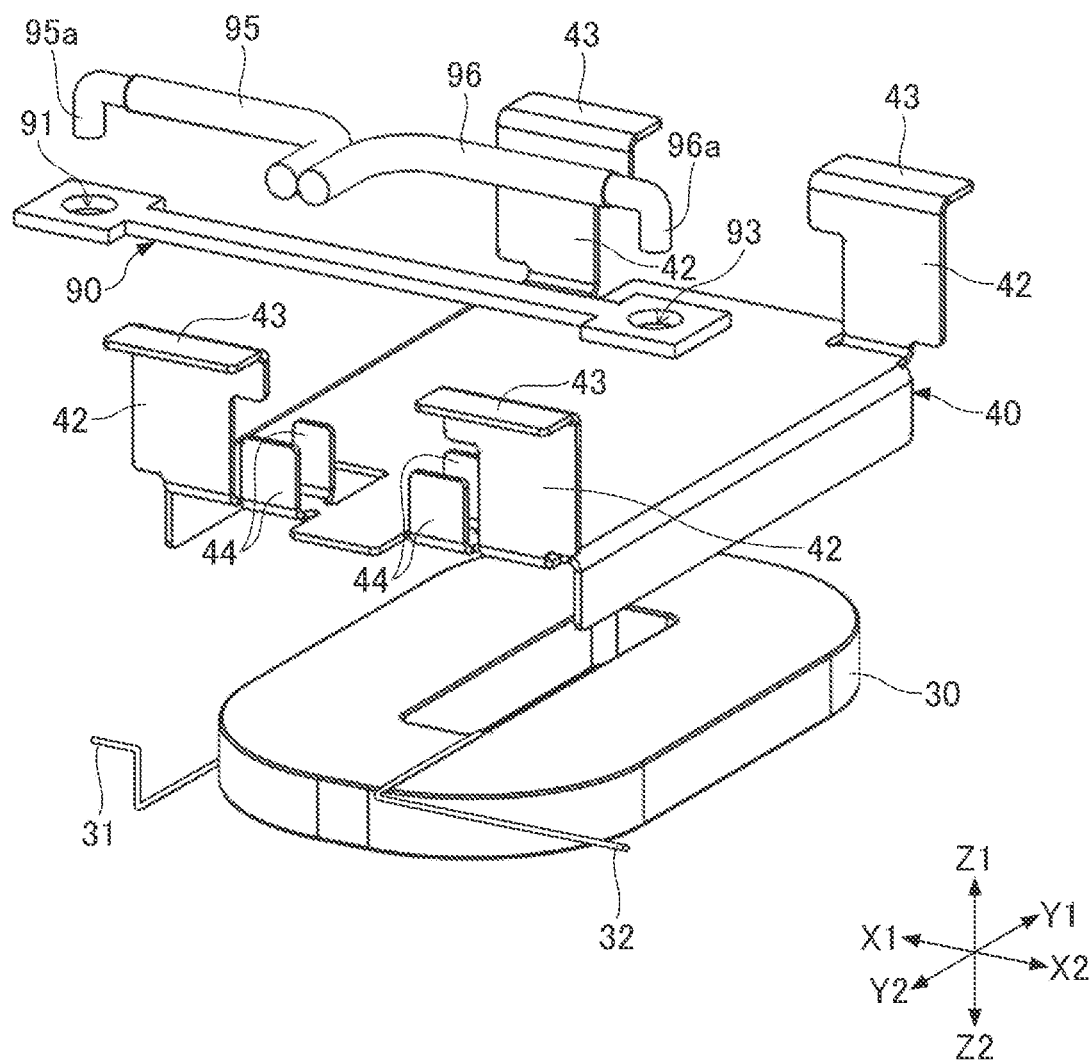
FIG. 6 is an exploded perspective view (2) of the bracket, the coil, and the flexible substrate of the vibration generating device according to the present embodiment.

As illustrated in FIG. 5 and FIG. 6, the coil 30 is wound so as to increase the length of the coil in the Y1-Y2 direction, and includes terminals 31 and 32 via which a current flows. The coil 30 is secured to a coil-mounting portion 41, by being bonded to the coil-mounting portion situated toward a Z2-side surface 40a of the bracket 40, with an adhesive. With this arrangement, the coil 30 is attached to the coil-mounting portion 41. On each of the Y1-side and Y2-side of the bracket 40, extending supports 42 for connection with the respective bracket supports 86 of the housing 80 are each formed to extend in the Z1-direction. Two extending supports 42 are provided on the Y1-side of the bracket 40, and two extending supports 42 are provided on the Y2-side of the bracket 40. These extending supports are each formed to have a given surface parallel to the XZ plane. By bending a Z1-side end of each extending support 42 outwardly at a substantially right angle such that the resulting bent portion extends in the X1-X2 direction with respect to the coil-mounting portion 41, a corresponding connection portion 43 having a mounting surface parallel to the XY plane is formed. On the Z1-side of the bracket 40, line supports 44 that restrict movement of the flexible substrate 90 and the connection lines 95 and 96 are provided. The bracket 40 is formed by punching and bending a metal plate, such as non-magnetic stainless steel.

With this arrangement, in the bracket 40, two extending supports 42 and two connection portions 43 are provided on one side surface 82-side, i.e., Y1-side, of the housing 80, when viewed in the X1-X2 direction that refers to a vibratory direction of the vibrator. Also, on the other side surface 82-side, i.e., the Y2-side, opposite the one side surface 82-side, two extending supports 42 and two connection portions 43 are provided in the X1-X2 direction referring to the vibratory direction of the vibrator.

The flexible substrate 90 is formed such that the longitudinal direction of the substrate refers to the X1-X2 direction. At an X1-side end of the flexible substrate 90, a through-hole 91 passing through the flexible substrate 90, as well as an electrode 92 that is disposed around the through-hole 91, are provided. At an X2-side end of the flexible substrate 90, a through-hole 93 passing through the flexible substrate 90, as well as an electrode 94 that is disposed around the through-hole 93, are provided. The electrodes 92 and 94 are provided at a Z2-side surface of the flexible substrate 90. The flexible substrate 90 is entirely formed of a flexible and insulating resin material, such as polyimide, and the electrodes 92 and 94 are each formed of a conductive metallic material, such as copper.

In the vibration generating device according to the present embodiment, the connection lines 95 and 96 are respectively provided to connect the terminals 31 and 32 of the coil 30. For the connection line 95, insulating of the connection line 95 is partially peeled off, and thus a conductor 95a that connects the terminal 31 of the coil 30 is exposed. The conductor 95a is bent in the Z2-direction so as to be inserted into the through-hole 91 of the flexible substrate 90. Also, for the connection line 96, insulating of the connection line 96 is partially peeled off, and thus a conductor 96a that connects the terminal 32 of the coil 30 is exposed. The conductor 96a is bent in the Z2-direction so as to be inserted into the through-hole 93 of the flexible substrate 90.

Figure 7:
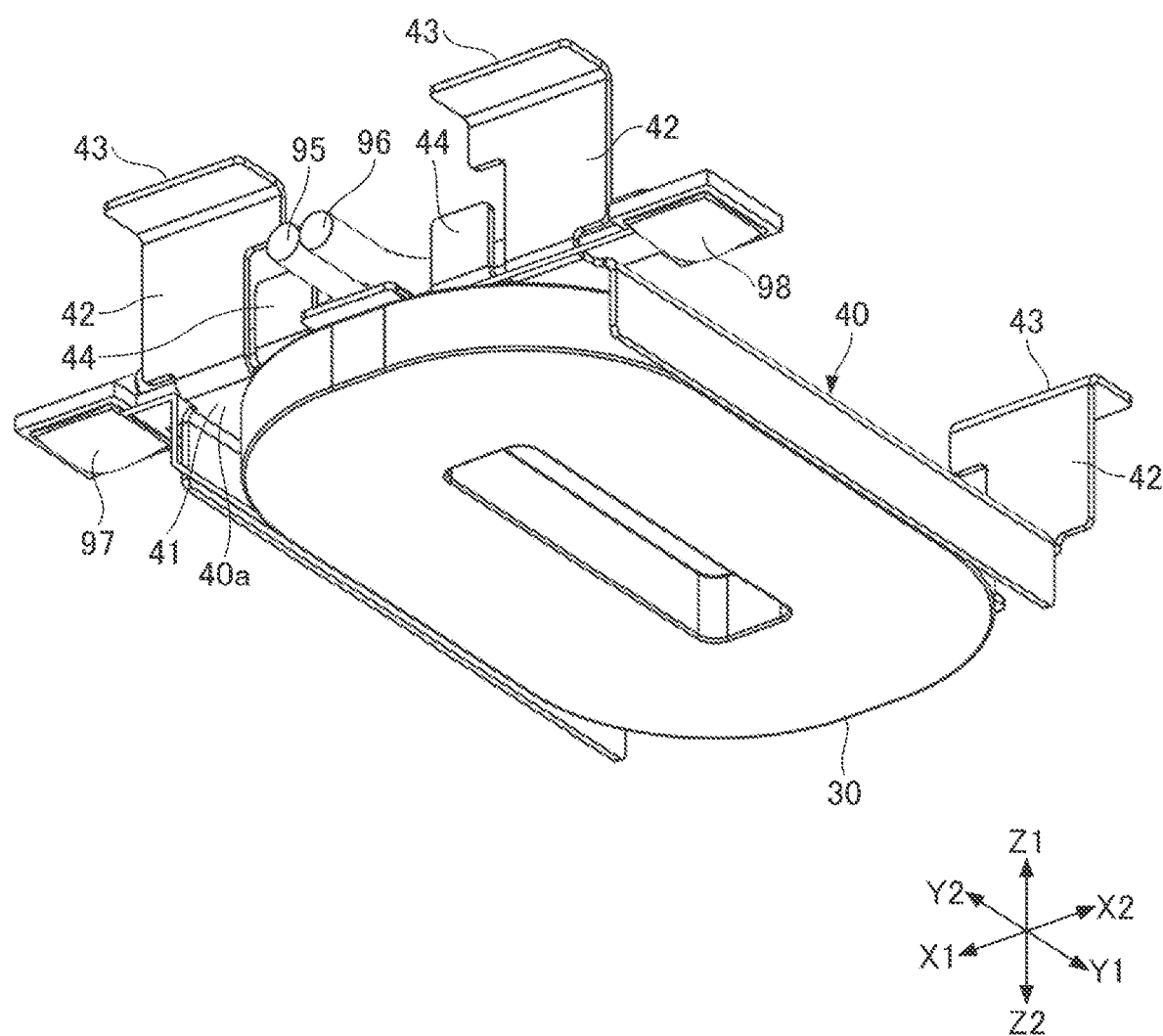
FIG. 7 is a perspective view (1) of the bracket, the coil, and the flexible substrate of the vibration generating device according to the present embodiment.
Figure 8:
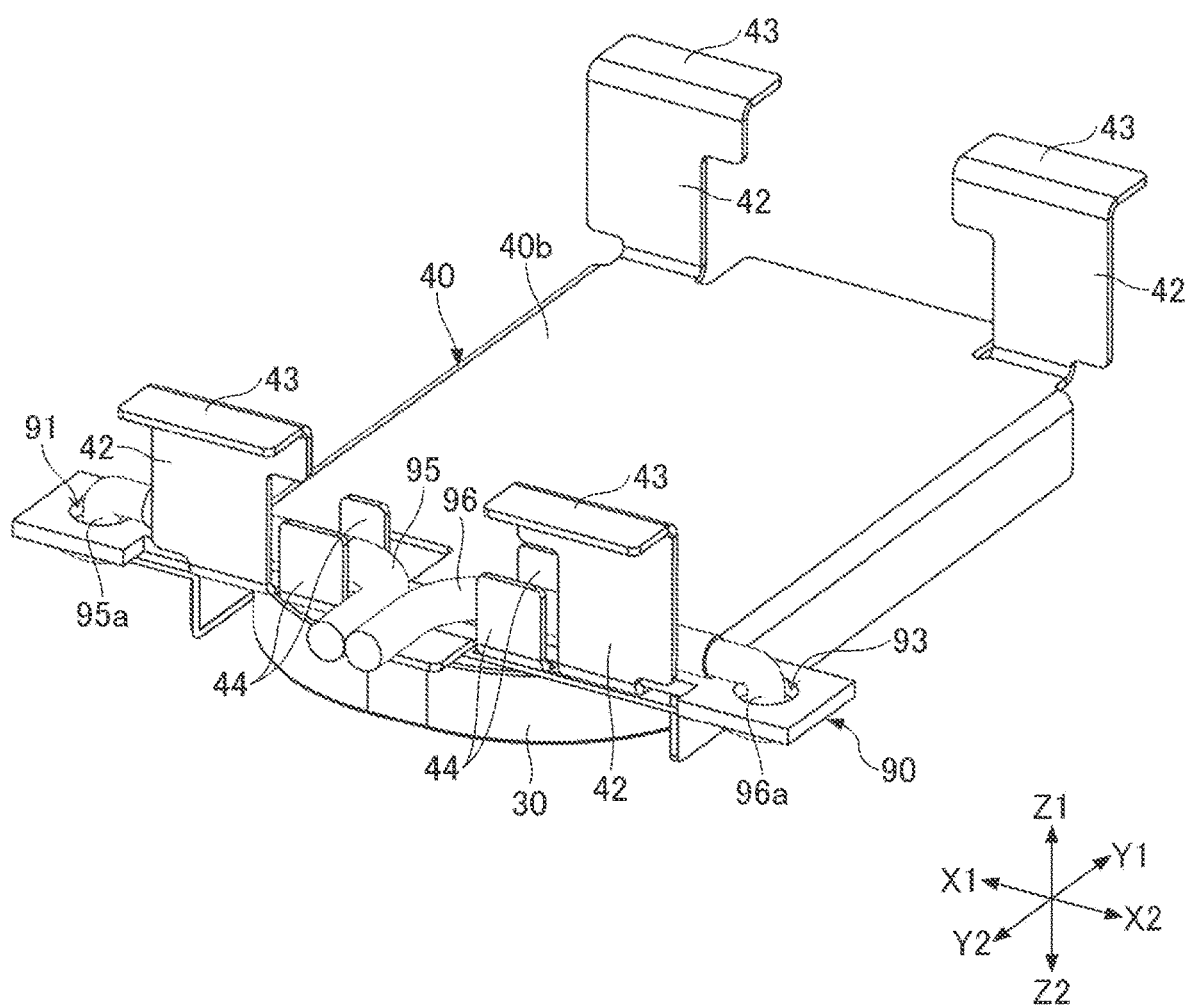
FIG. 8 is a perspective view (2) of the bracket, the coil, and the flexible substrate of the vibration generating device according to the present embodiment.

FIG. 7 and FIG. 8 illustrate the coil 30, the bracket 40, the flexible substrate 90, and the connection lines 95 and 96 that are integrally connected together. Specifically, the coil 30 is secured to the coil-mounting portion 41, by being bonded to the Z2-side surface 40a of the bracket 40 with an adhesive. The flexible substrate 90 and the connection lines 95 and 96 run through a gap between portions of each of the two line supports 44 that is provided on the Z-side surface 40b of the bracket 40. The Z2-side surface 40a of the bracket 40 may be referred to one surface, and the Z1-side surface 40b opposite the Z2-side surface 40a of the bracket 40 may be referred to as the other surface.

At the Z2-side electrode 92 of the flexible substrate 90, a bent portion of the conductor 95a of the connection line 95 is electrically connected, at one end, to the terminal 31 of the coil 30 with solder 97, in a state in which the bent portion is inserted through the through-hole 91 of the flexible substrate 90. Also, at the Z2-side electrode 94 of the flexible substrate 90, a bent portion of the conductor 96a of the connection line 96 is electrically connected, at one end, to the terminal 32 of the coil 30 with solder 98, in a state in which the bent portion is inserted through the through-hole 93 of the flexible substrate 90.

In this case, the electrodes 92 and 94 that are provided at the respective ends of the flexible substrate 90 in the X1-X2 direction are disposed outside the bracket 40 and are located in an interior of the housing 80. In the present embodiment, portions of the flexible substrate 90 at which a pair of the through-hole 91 and the electrode 92 and a pair of the through-hole 93 and the electrode 94 are respectively provided extend from sides of the bracket 40 in the X1-X2 direction. In this description, such a portion of the through-hole and the electrode extending from a given side of the bracket 40 may be referred to as an extending connection portion.

With this arrangement, the flexible substrate 90 and the electrodes 92 and 94 are provided inside the housing 80. At the electrode 92 of the flexible substrate 90, a portion at which the conductor 95a of the connection line 95 and the terminal 31 of the coil 30 are connected together with the solder 97 is disposed inside the housing 80. Further, a portion of the electrode 94 at which the conductor 96a of the connection line 96 and the terminal 32 of the coil 30 are connected together with the solder 98 is disposed inside the housing 80. Thus, these portions of the electrode 92 and 94 are not located outside the housing 80.

Therefore, when the vibration generating device according to the present embodiment is mounted on a given electronic device or the like, an extra space is not required. Also, for electrode portions at which the terminals 31 and 32 of the coil 30 are respectively connected to the conductors 95a and 96a of the connection lines 95 and 96, breakage or the like can be prevented.

In the present embodiment, the electrodes 92 and 94 provided at the respective ends of the flexible substrate 90 in the X1-X2 direction are disposed outside the bracket 40. With this arrangement, when the conductor 95a of the connection line 95 and the terminal 31 of the coil 30 are jointed, with the solder 97, at the electrode 92 of the flexible substrate 90, workability of soldering can be improved. Likewise, when the conductor 96a of the connection line 96 and the terminal 32 of the coil 30 are jointed, with the solder 98, at the electrode 94 of the flexible substrate 90, workability of soldering can be improved.

As illustrated in FIG. 2, the upper yoke 20 is formed to have a substantially rectangular flat plate shape of which the longitudinal direction refers to the X1-X2 direction and the transverse direction refers to the Y1-Y2 direction. Cutout portions 21 are respectively provided on the X1-side and X2-side of the upper yoke 20. The longitudinal direction of the lower yoke 60 is the X1-X2 direction and a recess 61 is formed in the lower yoke 60. Specifically, the lower yoke 60 includes (i) a bottom 62 parallel to the XY plane and (ii) two side surfaces 63 that are parallel to the YZ plane and respectively extend in the Z1-direction when viewed from the X1-side and X2-side of the bottom 62. The recess 61 is formed with the bottom 62 and the two side surfaces 63. Protrusions 64, which are each provided to protrude from a portion of the Z1-side end of a corresponding side surface 63, are respectively provided at the Z1-side ends of the side surfaces 63. The lower yoke 60 and the upper yoke 20 are securely joined in a state in which the protrusions 64 on the side surfaces 63 are respectively fit to the cutout portions 21 of the upper yoke 20. At the Z1-side surface of the magnet 50, an S pole is situated on the X1-side and an N pole is situated on the X2-side. Also, at the Z2-side of the magnet 50, an N pole is situated on the X1-side and an S pole is situated on the X2-side.

When the vibrator of the vibration generating device according to the present embodiment is assembled, the magnet 50 is bonded to the bottom 62 of the recess 61 of the lower yoke 60, in a state in which the protrusions 64 of the lower yoke 60 are respectively fit to the cutout portions 21 of the upper yoke 20. In the present embodiment, the lower yoke 60, which surrounds the magnet 50, and the upper yoke 20 are separate members, and thus assembling is easily performed.

Figure 9:
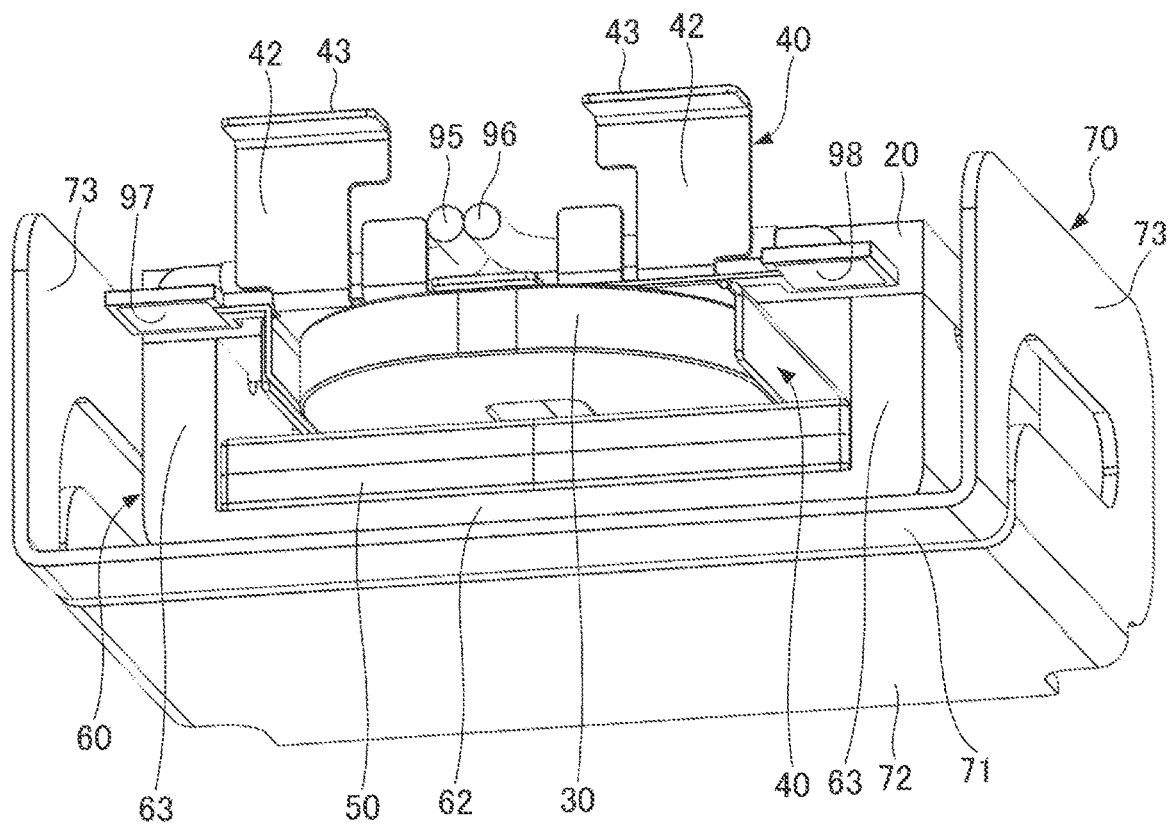
FIG. 9 is a perspective view (1) of a vibrator and a resilient member of the vibration generating device according to the present embodiment.
Figure 9:
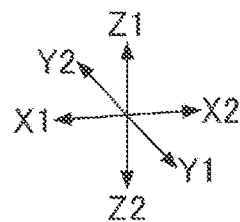
Figure 10:
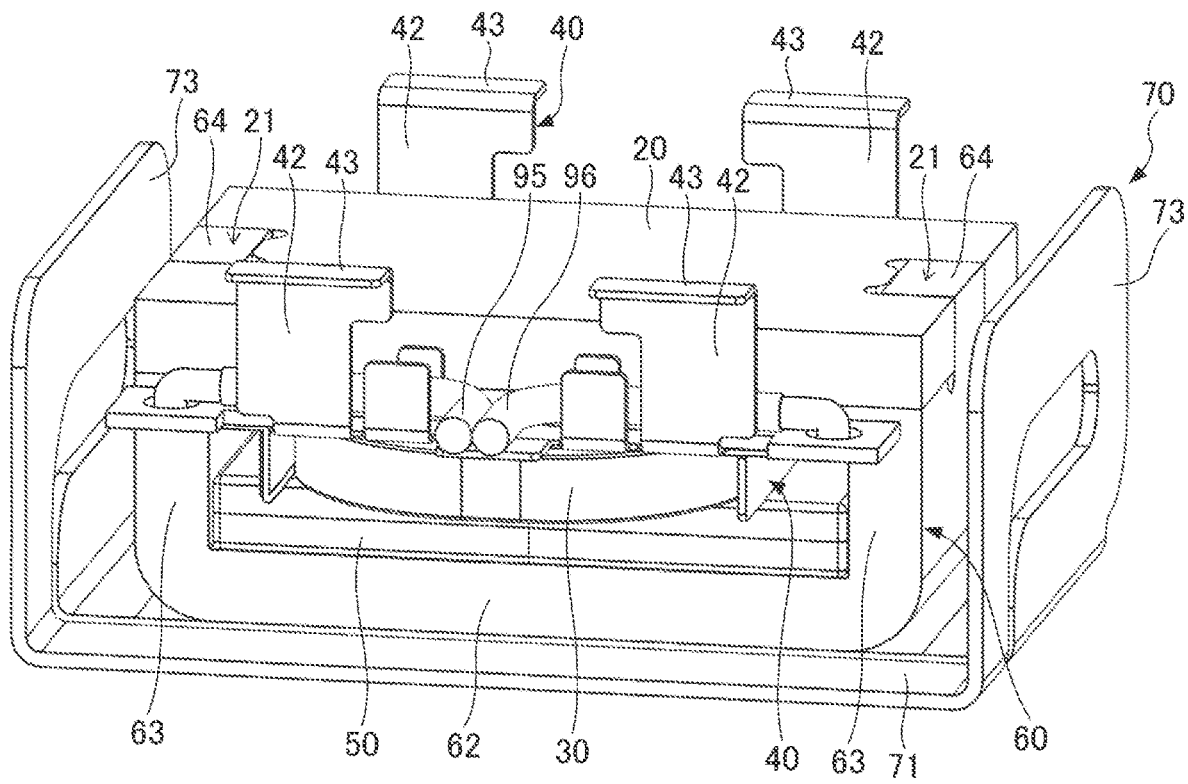
FIG. 10 is a perspective view (2) of the vibrator and the resilient member of the vibration generating device according to the present embodiment.
Figure 10:
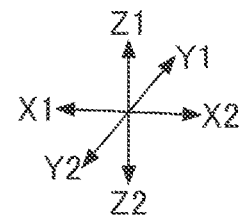

In other words, as illustrated in FIG. 9 and FIG. 10, the Z2-side surface of the magnet 50 is bonded to the Z1-side surface of the bottom 62 of the recess 61 in the lower yoke 60, and the upper yoke 20 and the lower yoke 60 are bonded and secured to each other in a state in which the protrusions 64 situated at the Z1-side ends of the side surfaces 63 of the lower yoke 60 are respectively fit to the cutout portions 21 of the upper yoke 20. The coil 30 secured to the bracket 40 is disposed at a space that is defined by (i) the lower yoke 60 having the recess 61 and (ii) the upper yoke 20, and the coil 30 is situated on the Z1-side of the magnet 50.

As illustrated in FIG. 9 and FIG. 10, the resilient member 70 includes a housing-connection portion 71, a vibrator support 72, and a spring 73. Fixing of the housing-connection portion 71 is performed by connecting a Z2-side surface of the housing-connection portion 71 to the Z1-side surface of the resilient member supports 85 of the housing 80. The Z2-side of the vibrator, which is constituted by the upper yoke 20, the magnet 50, and the lower yoke 60, is bonded and secured to the Z1-side surface of the vibrator support 72. The spring 73 is a portion that connects the housing-connection portion 71 to the vibrator support 72. The spring is elastic.

Each resilient member support 85 of the housing 80 is formed on the Z1-side of the bottom 81 of the housing 80. With this arrangement, in a state in which the housing-connection portion 71 of the resilient member 70 is attached to the resilient member supports 85 of the housing 80, a space is provided between the bottom 81 of the housing 80 and the vibrator support 72 of the resilient member 70. Thus, even if the vibrator support 72 of the resilient member 70 vibrates in the X1-X2 direction, the bottom 81 of the housing 80 does not prevent the vibrating of the vibrator support 72.

The resilient member 70 is formed by (i) punching a non-magnetic stainless metal plate, e.g., a non-magnetic stainless metal plate having a thickness of 0.1 mm and then (ii) bending the punched metal plate. The spring 73 is formed by bending both the X1-side and X2-side of the metal plate substantially perpendicularly, i.e., in the Z1-direction so as to be along bent lines parallel to the Y1-Y2 direction, respectively. With this arrangement, in the resilient member 70, the housing-connection portion 71 and the vibrator support 72 are coplanar.

Figure 11:
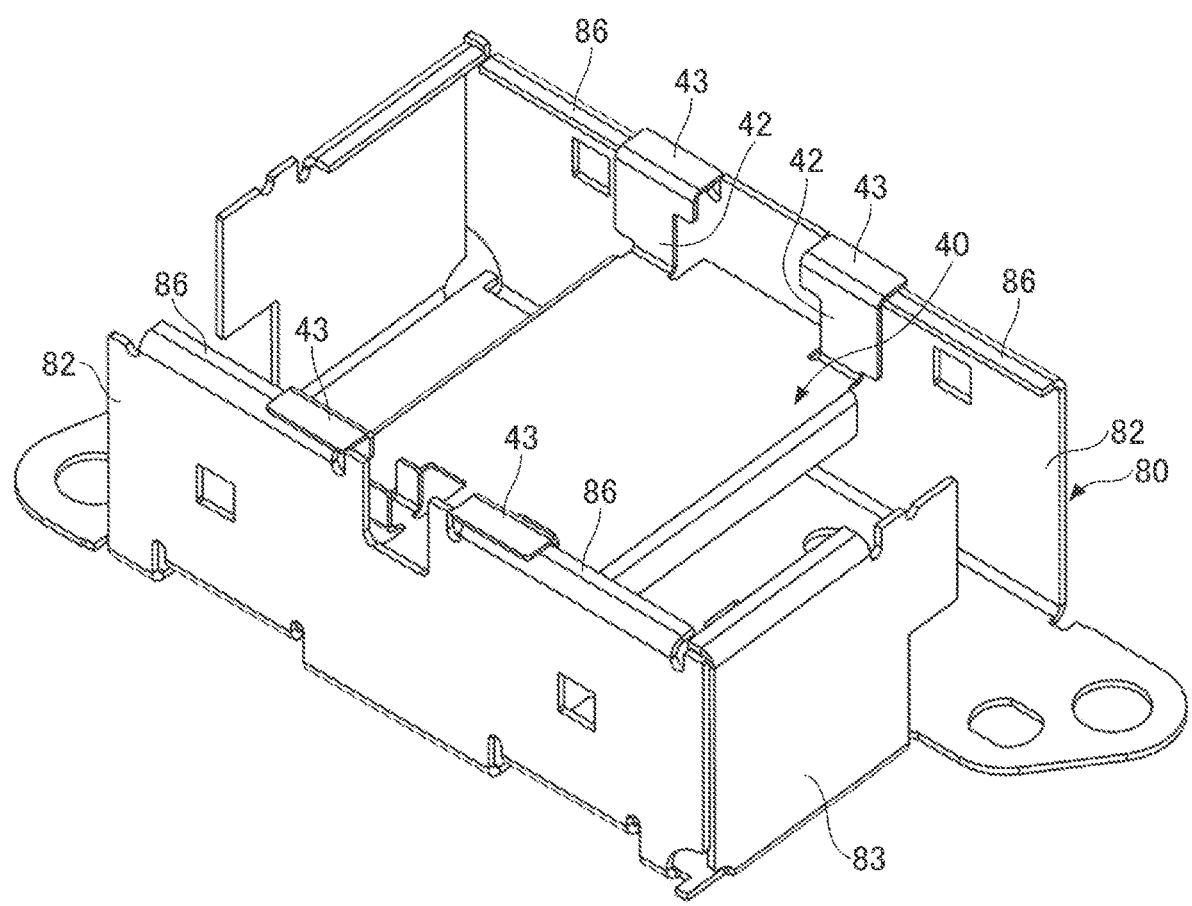
FIG. 11 is a diagram (1) for describing the vibration generating device according to the present embodiment.
Figure 11:
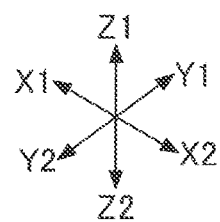
Figure 12:
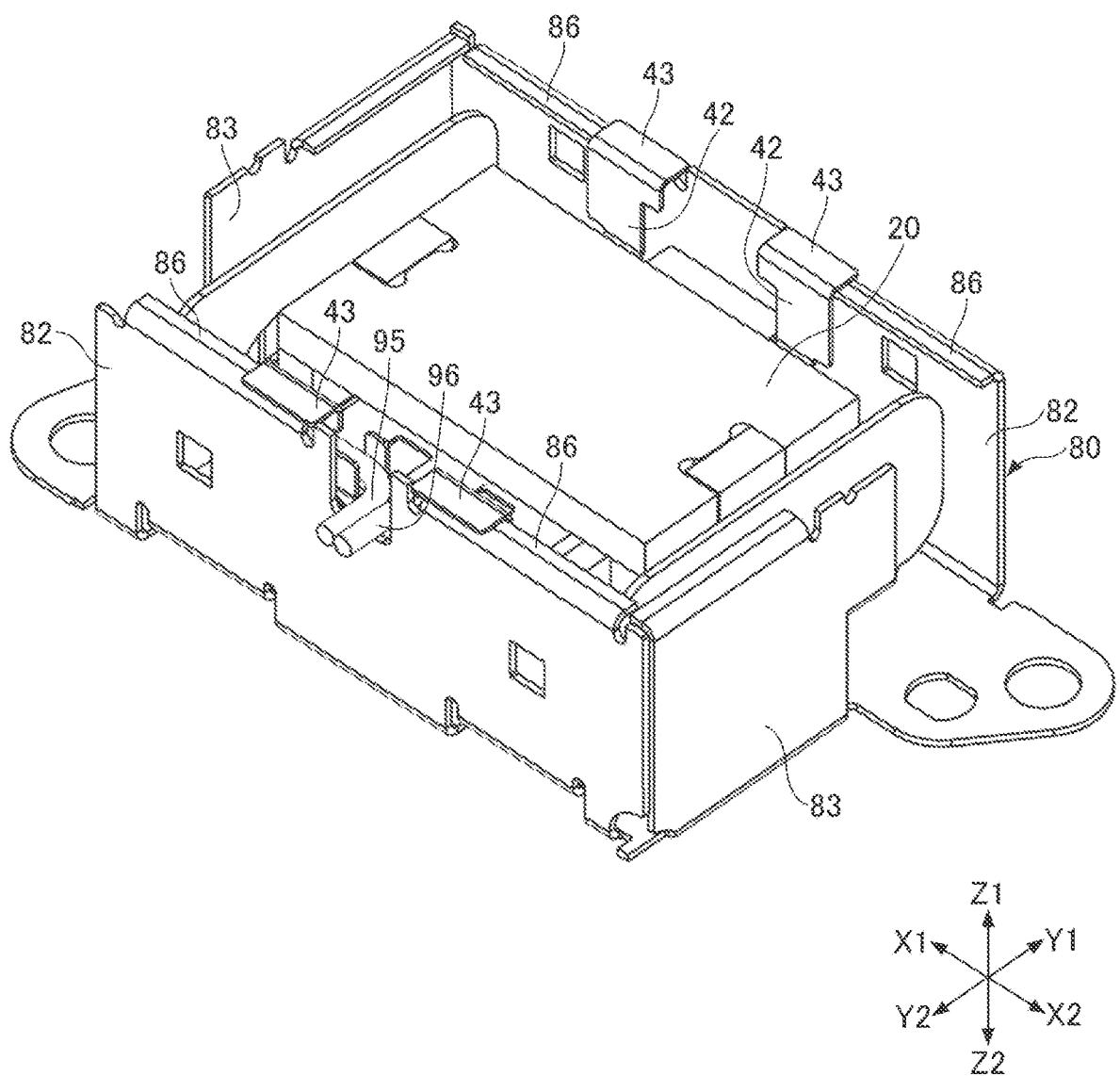
FIG. 12 is a diagram (2) for describing the vibration generating device according to the present embodiment.

As illustrated in FIG. 11 and FIG. 12, in order to connect the bracket 40 to the housing 80, the connection portions 43 at four extending supports 42, which are provided in the bracket 40, are respectively disposed on the bracket supports 86 provided in the housing 80, so as to be bonded to the bracket supports 86. For the sake of convenience, FIG. 11 illustrates only the bracket 40 and the housing 80. FIG. 12 illustrates the vibration generating device from which the cover 10 is removed according to the present embodiment. Each connection portion 43 of the bracket 40 and a corresponding bracket support 86 of the housing 80 is joined by laser welding or the like. The laser welding can be performed even in a relatively small area, and it is preferable to manufacture the vibration generating device according to the present embodiment that is required to be made compact.

The laser welding may include, for example, (i) laser welding that employs a $CO_2$ laser, as a light source, or (ii) laser welding that employs a YAG laser as the light source. In the present embodiment, with use of the laser welding, each connection portion 43 of the bracket 40 is bonded to the bracket support 86 of the housing 80. In this case, the width of each bracket support 86 of the housing 80 in the Y1-Y2 direction is preferably greater than or equal to 1 mm and less than or equal to 2 mm. This is because if the width of the bracket support 86 in the Y1-Y2 direction is excessively reduced, laser welding is difficult to be performed. Also, if such a width is excessively increased, the size of the vibration generating device is increased.

In the vibration generating device according to the present embodiment, the vibrator, which is constituted by (i) the upper yoke 20 supported at the Z1-side surface of the vibrator support 72 of the resilient member 70, (ii) the magnet 50, and (iii) the lower yoke 60, vibrates in the X1-X2 direction by passing an alternating current through the coil 30. The connection portions 43 of the bracket 40 and the bracket supports 86 of the housing 80 are each formed such that the longitudinal direction thereof refers to the X1-X2 direction that is a vibratory direction of the vibrator. On each of the X1-side and the X2-side, two connection portions 43 of the bracket 40 and two bracket supports 86 of the housing 80 are provided along the X1-X2 direction that is the vibratory direction of the vibrator. The vibrator is constituted by the upper yoke 20, the magnet 50, and the lower yoke 60, and is not connected to the bracket 40 and the coil 30.

Figure 13:
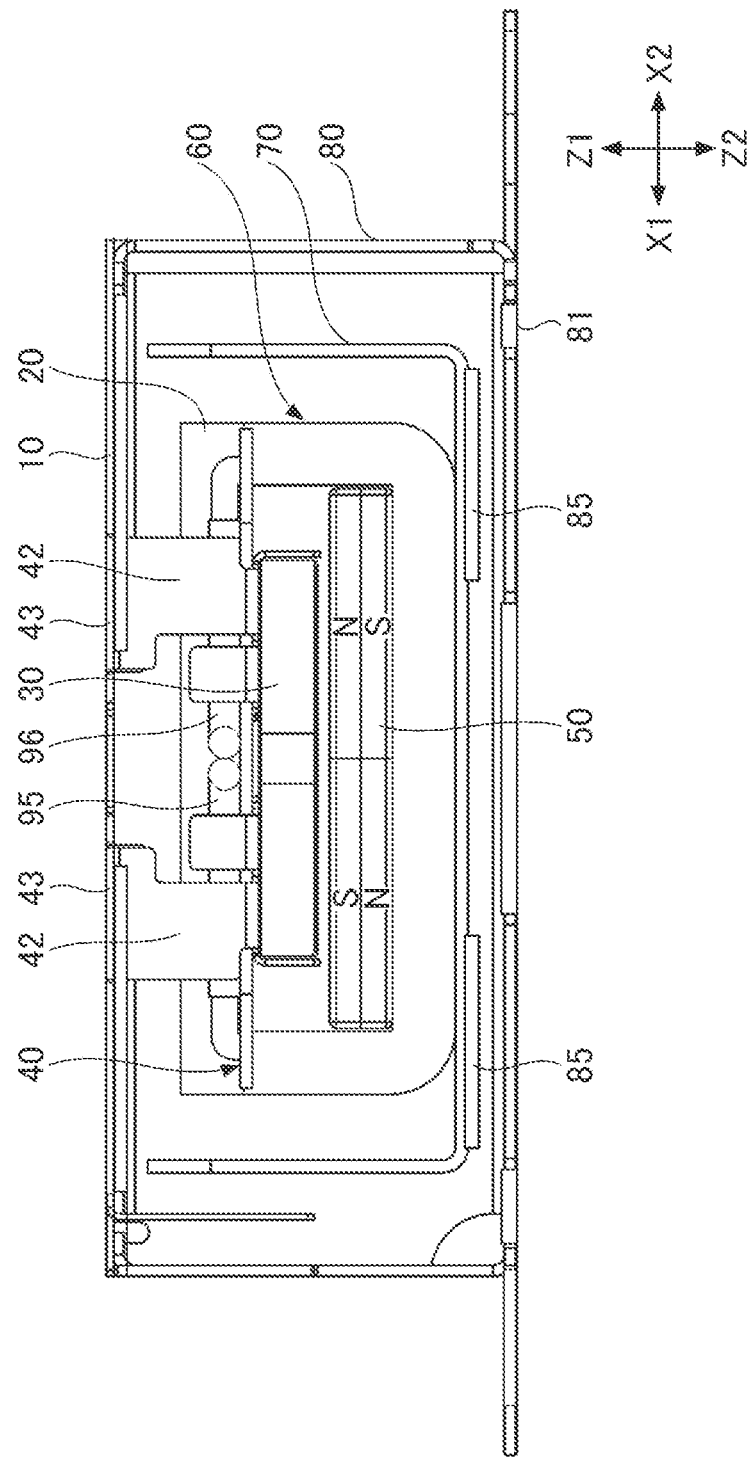
FIG. 13 is a cross-sectional view of the vibration generating device according to the present embodiment.
Figure 14:
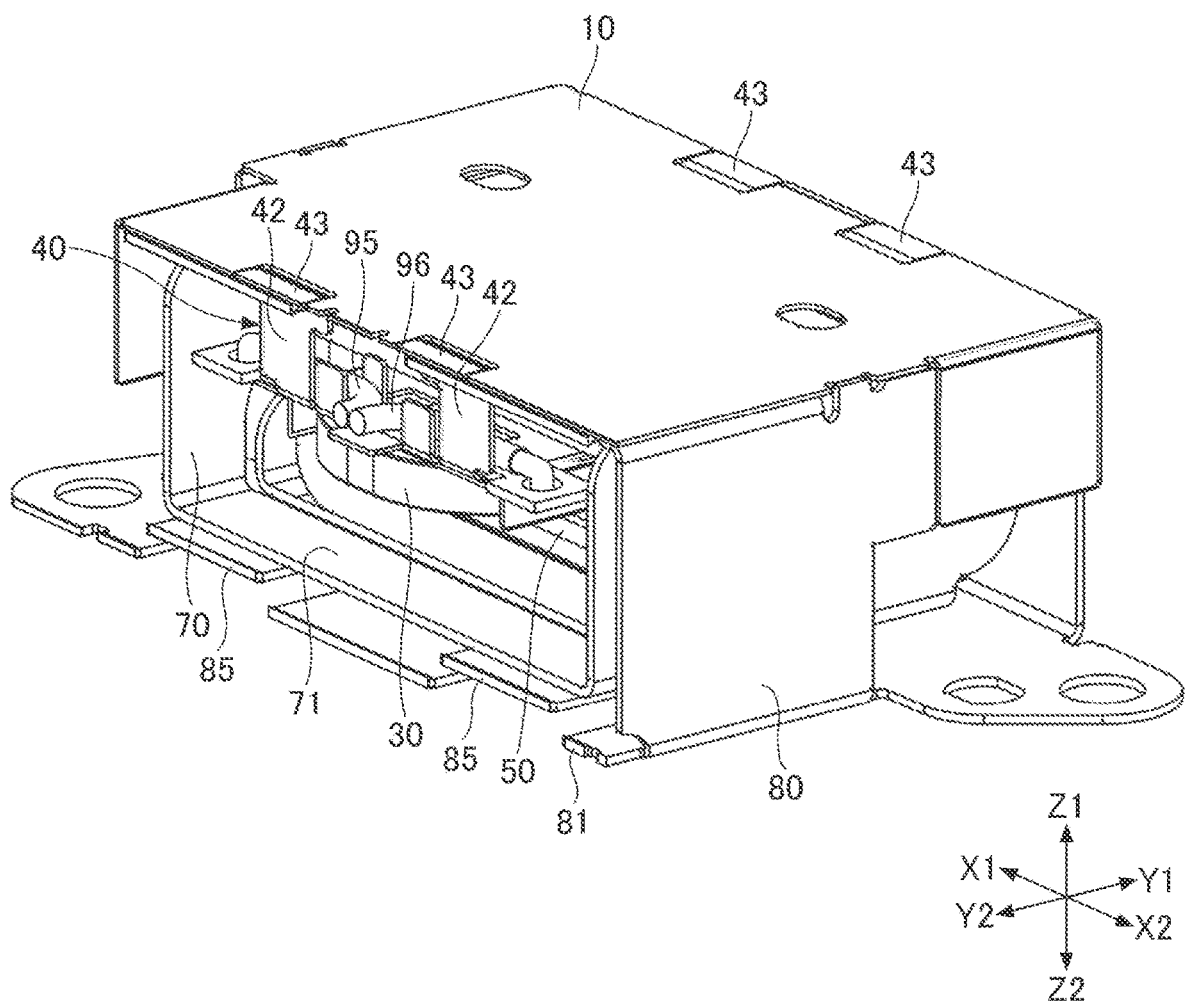
FIG. 14 is a cross-sectional perspective view of the vibration generating device according to the present embodiment.

Hereafter, vibrations of the vibration generating device according to the present embodiment will be described with reference to FIG. 13 and FIG. 14. FIG. 13 is a cross-sectional view of the vibration generating device taken along a plane parallel to the XZ plane according to the present embodiment. FIG. 14 is a cross-sectional perspective view of the vibration generating device. In the vibration generating device according to the present embodiment, a space is provided between the coil 30 and the magnet 50. The magnet 50 is a permanent magnet, and thus magnetic field lines are obtained through a magnetic field of the magnet 50.

Specifically, on the X1-side of the magnet 50, magnetic field lines are obtained through the Z2-side N pole, pass through an interior of each of the lower yoke 60 and the upper yoke 20, pass through a space between the upper yoke 20 and the X1-side S pole of the magnet 50, and reach the X1-side S pole of the magnet 50. Also, on the X2-side of the magnet 50, magnetic field lines are obtained through the Z1-side N pole, pass through a space between the X2-side N pole of the magnet 50 and the upper yoke 20, pass through the interior of each of the upper yoke 20 and the lower yoke 60, and then reach the X2-side S pole of the magnet 50. On the Z1-side of the magnet 50, magnetic field lines are also obtained through the X2-side N pole of the magnet 50, and then reach the X1-side S pole. Also, on the Z2-side of the magnet 50, magnetic field lines are also obtained through the X1-side N pole of the magnet 50, and then reach the X2-side S pole.

With this arrangement, in an area surrounded by the upper yoke 20 and the lower yoke 60, the magnetic field is increased by magnetic field lines concentrating in the space between the upper yoke 20 and the magnet 50. The coil 30 is located in such a space defined by the above area. In the present embodiment, the vibrator that is constituted by the upper yoke 20, the magnet 50, and the lower yoke 60 can vibrate in the X1-X2 direction, by passing the alternating current between the terminal 31 and terminal 32 of the coil 30.

For example, when the current flows into the coil 30 such that the terminal 31 of the coil 30 is positive and the terminal 32 is negative, the vibrator constituted by the upper yoke 20, the magnet 50, and the lower yoke 60 moves in the X2-direction. Also, when the current flows into the coil 30 such that the terminal 31 of the coil 30 is negative and the terminal 32 is positive, the vibrator constituted by the upper yoke 20, the magnet 50, and the lower yoke 60 moves in the X1-direction. With this arrangement, the vibrator constituted by the upper yoke 20, the magnet 50, and the lower yoke 60 can vibrate in the X1-X2 direction, in accordance with the current that flows into the coil 30 such that the terminal 31 and terminal 32 of the coil 30 alternate between the positive and the negative. The bracket 40 to which the coil 30 is attached is connected to the housing 80 and is separated from the vibrator. Thus, the coil 30 and the bracket 40 do not vibrate.

Although the embodiments have been described, the present disclosure is not limited to a specific embodiment. Various modifications or changes can be made without departing from the scope of the present disclosure.

What is claimed is:

1. A vibration generating device comprising:
    a housing including a substantially rectangular bottom plate and four side plates, the housing having an interior space;
    a vibrator including a magnet;
    a resilient member between the housing and the vibrator;
    a coil configured to generate a magnetic field that causes the vibrator to vibrate; and
    a bracket including a coil-mounting portion on which the coil is mounted,
    wherein the housing includes bracket supports provided at one ends of two side plates facing each other among the four side plates, the one ends being situated opposite the other ends, of the two side plates, to which the bottom plate is connected,
    wherein the bracket includes connection portions bonded to the respective bracket supports, and
    wherein the bracket supports of the housing and the connection portions of the bracket are connected together in a state in which the bracket is placed in the interior space of the housing.

2. The vibration generating device according to claim 1, wherein the bracket includes
    extending supports, each extending support being formed by bending a portion of the coil-mounting portion at a right angle, and
    the connection portions, each connection portion being formed by bending a corresponding extending support at the right angle, and
    wherein each bracket support is formed by bending a corresponding side plate at a right angle.

3. The vibration generating device according to claim 2, wherein each connection portion in the bracket is formed by bending a corresponding extending support such that a resulting bent portion extends in a vibratory direction of the vibrator, and wherein each bracket support of the housing is formed by bending a corresponding side plate such that a resulting bent portion extends in the vibratory direction of the vibrator.

4. The vibration generating apparatus according to claim 2, wherein the bracket includes two extending supports and two connection portions that are situated toward a first side plate among the four side plates of the housing, each of the two extending supports being along the vibratory direction of the vibrator, and two extending supports and two connection portions that are situated toward a second side plate opposite the first side plates among the four side surfaces of the housing, each of the two extending supports being along the vibratory direction of the vibrator.

5. The vibration generating device according to claim 2, wherein each connection portion of the bracket and a corresponding bracket support of the housing are joined by laser welding.

6. The vibration generating device according to claim 1, wherein the bracket includes extending supports, each extending support being formed by bending a portion of the coil-mounting portion at a right angle, and wherein each connection portion of the bracket is formed by bending a corresponding extending support in a direction opposite a direction in which the coil-mounting portion is provided.

7. The vibration generating device according to claim 6, wherein a width of each bracket support of the housing is greater than or equal to 1 mm and less than or equal to 2 mm, in a direction perpendicular to the vibratory direction of the vibrator.

* * * * *